US011263473B2

(12) United States Patent
Kim et al.

(10) Patent No.: US 11,263,473 B2
(45) Date of Patent: Mar. 1, 2022

(54) METHOD AND DEVICE FOR RECOMMENDING CLOTH COORDINATING INFORMATION

(71) Applicant: LG ELECTRONICS INC., Seoul (KR)

(72) Inventors: Ji Hye Kim, Seoul (KR); Jin Sung Park, Hwaseong-si (KR); Moon Sub Jin, Yongin-si (KR); Ji Young Huh, Yongin-si (KR); Beom Oh Kim, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 16/579,465

(22) Filed: Sep. 23, 2019

(65) Prior Publication Data

US 2020/0019811 A1 Jan. 16, 2020

(30) Foreign Application Priority Data

Aug. 16, 2019 (KR) .......................... 10-2019-0100133

(51) Int. Cl.
*G06K 9/62* (2006.01)
*G06N 3/08* (2006.01)
(Continued)

(52) U.S. Cl.
CPC ........... *G06K 9/6201* (2013.01); *G06F 16/51* (2019.01); *G06F 16/55* (2019.01); *G06K 9/46* (2013.01);
(Continued)

(58) Field of Classification Search
CPC ...... G06K 9/6201; G06K 9/46; G06K 9/6262; G06K 9/6267; G06K 9/6271;
(Continued)

(56) References Cited

U.S. PATENT DOCUMENTS

2004/0039592 A1* 2/2004 Shima .................. G06T 19/00
705/26.1
2008/0262944 A1* 10/2008 Wu .................... G06Q 30/0643
705/27.2

FOREIGN PATENT DOCUMENTS

| KR | 10-0370363 B1 | 1/2003 |
| KR | 10-1954032 B1 | 3/2019 |

* cited by examiner

*Primary Examiner* — Charlotte M Baker
(74) *Attorney, Agent, or Firm* — Birch, Stewart, Kolasch & Birch, LLP

(57) ABSTRACT

Disclosed are a method and an apparatus for recommending clothing coordination information in the 5G communication environment by executing an artificial intelligence (AI) algorithm and/or a machine learning algorithm, which have been mounted therein. A method for recommending clothing coordination information according to an embodiment of the present disclosure may include classifying style information through an analysis of a collected clothing image, calculating a harmony matching score between clothing images included in the classified style information or a TPO matching score on a time, a place, and an occasion of each of the clothing images and registering the calculated score in a database, recognizing a clothing coordination request speech voice received from a user, and confirming the speech intention of the clothing coordination request speech voice of the user, and recommending clothing coordination information corresponding to the speech intention, based on the harmony matching score or the TPO matching score.

15 Claims, 11 Drawing Sheets

(51) Int. Cl.
- *G10L 15/22* (2006.01)
- *G10L 15/18* (2013.01)
- *G06K 9/46* (2006.01)
- *G06F 16/55* (2019.01)
- *G06F 16/51* (2019.01)

(52) U.S. Cl.
CPC ......... *G06K 9/6262* (2013.01); *G06K 9/6267* (2013.01); *G06N 3/08* (2013.01); *G10L 15/1815* (2013.01); *G10L 15/22* (2013.01); *G10L 2015/223* (2013.01)

(58) Field of Classification Search
CPC ........ G06K 9/4671; G06K 9/481; G06N 3/08; G06N 7/005; G06N 20/10; G06N 3/084; G06N 3/0454; G10L 15/22; G10L 15/1815; G10L 2015/223; G10L 15/26; G06F 16/55; G06F 16/51; G06Q 50/10
USPC ............... 382/156, 118; 705/27.2, 17, 26.61; 463/16

See application file for complete search history.

FIG. 5
(a) 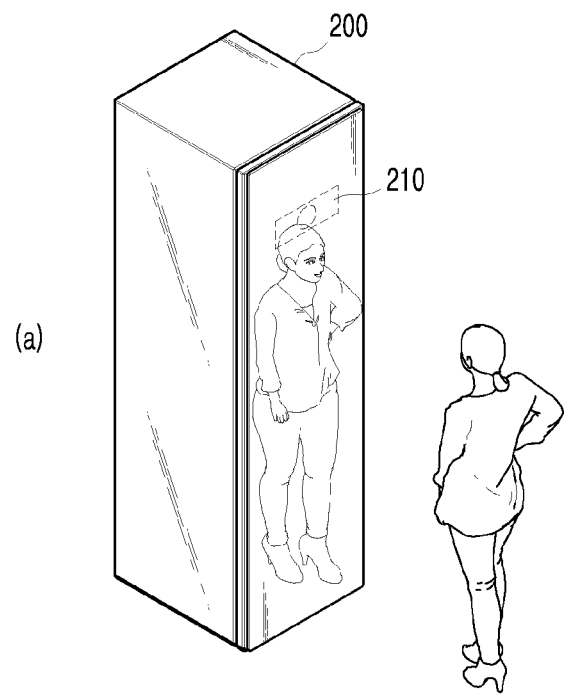
(b) 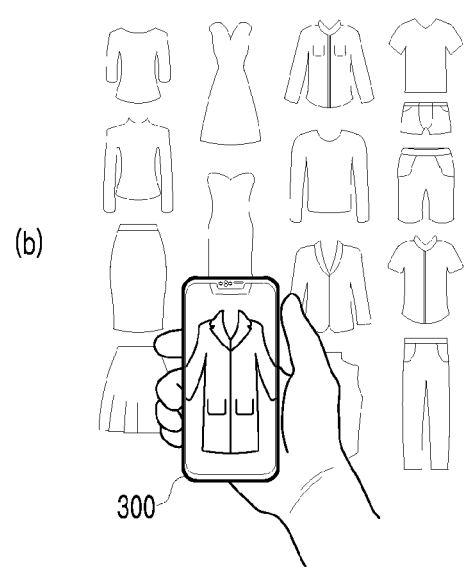

(a)  (b)

METHOD AND DEVICE FOR RECOMMENDING CLOTH COORDINATING INFORMATION

CROSS-REFERENCE TO RELATED APPLICATION

This present application claims benefit of priority to Korean Patent Application No. 10-2019-0100133, entitled "METHOD AND DEVICE FOR RECOMMENDING CLOTH COORDINATING INFORMATION", filed on Aug. 16, 2019, in the Korean Intellectual Property Office, the entire disclosure of which is incorporated herein by reference.

BACKGROUND

1. Technical Field

The present disclosure relates to a method and an apparatus for recommending clothing coordination information, and more particularly, to a method and an apparatus for recommending clothing coordination information to be suitable for the user request based on clothing information actually owned by the user itself and time, place, and occasion (TPO) information.

2. Description of Related Art

A clothing processing apparatus may be collectively referred to as an apparatus for removing contaminants stained on clothing by applying water into a processing chamber receiving the clothing, drying wet clothing by applying dry air thereto, or refreshing (e.g., removing wrinkle or odor) the clothing by blowing air or applying steam.

In particular, Related Art 1 and Related Art 2 disclose a technology of processing clothing by receiving the clothing in the clothing processing apparatus.

Related Art 1 discloses a technology for a clothing cleaning management apparatus for easily and efficiently performing dry, sterilization, anti-wrinkle, etc. for the clothing at the same time by providing steam, drying, and a moving hanger to the clothing stored therein, but it is not possible to collect the clothing information actually owned by the user through the clothing cleaning management apparatus, and accordingly, it is not possible to recommend clothing coordination information to be suitable for the user request.

Related Art 2 discloses a technology for a multi-purpose clothing dryer that may be used as a closet as necessary while removing winkle by providing hot and humid hot air when drying the clothing, and at the same time obtaining sterilization and deodorizing effects, etc., but it is not possible to collect the clothing information actually owned by the user through the clothing dryer, and accordingly, it is not possible to recommend the clothing coordination information to be suitable for the user request.

The above-described background art is technical information retained by the inventor to derive the present disclosure or acquired by the inventor while deriving the present disclosure, and thus should not be construed as art that was publicly known prior to the filing date of the present disclosure.

RELATED ART DOCUMENTS

Patent Documents

Related Art 1: Korean Patent No. 10-1954032 (Feb. 25, 2019)

Related Art 2: Korean Patent No. 10-0370363 (Jan. 16, 2003)

SUMMARY OF THE DISCLOSURE

An object of the present disclosure is to construct a database for each style by collecting the clothing information actually owned by the user from a clothing processing home appliance and/or a user terminal, and to recommend clothing coordination information to be suitable for the user request based on clothing information actually owned by the user itself.

Another object of the present disclosure is to construct a database for each style by collecting the clothing information actually owned by the user from a clothing processing home appliance and/or a user terminal, and to recommend clothing coordination information to be suitable for the user request based on clothing information actually owned by the user itself and TPO information.

Still another object of the present disclosure is to construct a database for each style by collecting the clothing information actually owned by the user from a clothing processing home appliance and/or a user terminal, and to recommend clothing coordination information to be suitable for the user request based on clothing information actually owned by the user itself, weather information, and TPO information.

Yet another object of the present disclosure is to notify the user of a harmony matching score by calculating the harmony matching score between clothing information actually owned by the user itself and clothing image that the user intends to purchase, when the clothing image that the user intends to purchase is received from the user terminal.

A method for recommending clothing coordination information according to an embodiment of the present disclosure may include recommending clothing coordination information to be suitable for the user request based on clothing information actually owned by a user itself and TPO information.

Specifically, the method for recommending the clothing coordination information according to an embodiment of the present disclosure may include classifying style information through an analysis of a collected clothing image, calculating a harmony matching score between clothing images included in the classified style information or a TPO matching score on a time, a place, and an occasion of each of the clothing images and registering the calculated score in a database, recognizing a clothing coordination request speech voice received from a user, and confirming the speech intention of the clothing coordination request speech voice of the user, and recommending clothing coordination information corresponding to the speech intention, based on the harmony matching score or the TPO matching score registered in the database.

According to the method for recommending the clothing coordination information according to the present embodiment, it is possible to construct the database for each style by collecting clothing information actually owned by the user from the clothing processing home appliance and/or the user terminal, and to recommend the clothing coordination information to be suitable for the user request based on the clothing information actually owned by the user itself, thereby helping the user to wear the clothing.

In addition, the classifying the style information may include classifying appearance style information of the collected clothing image by analyzing a feature vector extracted from the collected clothing image by using a first deep neural network model previously trained so as to classify appearance style information of a clothing image by analyzing a feature vector extracted from the clothing image, and classifying abstract style information of the collected clothing image by analyzing the appearance style information generated from the collected clothing image by using a second deep neural network model previously trained so as to classify abstract style information of a clothing image by analyzing the appearance style information of the clothing image.

In addition, the confirming the speech intention may include extracting information on at least one of a time, a place, or an occasion to wear the coordinated clothing from the clothing coordination request speech voice received from the user, and the recommending the clothing coordination information may include recommending the clothing coordination information corresponding to the speech intention based on the extracted information on at least one of the time, the place, or the occasion and the TPO matching score of each of the clothing images stored in the database.

In addition, the registering the database may include calculating the harmony matching score of the collected clothing image on a clothing image owned by the user and registering the harmony matching score in the database, based on the similarity between style information including the appearance style information and the abstract style information on the collected clothing image, and style information on the clothing image owned by the user registered in the database.

In addition, the registering in the database may include calculating the harmony matching score of the collected clothing image on an image for which clothing coordination has been completed and registering the harmony matching score in the database, based on the similarity between the collected clothing image, and the image for which the clothing coordination has been completed and has been collected from clothing shopping malls.

In addition, the recommending may include recommending the clothing coordination information in the order of the highest score combination of the harmony matching scores of the clothing registered in the database, based on the speech intention of the clothing coordination request speech voice.

In addition, the method for recommending clothing coordination information according to the present embodiment may further include collecting weather information of a date when the clothing coordination request speech voice is received, and the recommending may include recommending the clothing coordination information in the order of the highest score combination of the harmony matching scores of the clothing images registered in the database, based on the speech intention of the clothing coordination request speech voice and weather information of the date when the clothing coordination request speech voice is received.

In addition, the method for recommending clothing coordination information according to the present embodiment may further include collecting a clothing image that the user intends to purchase from a user terminal, calculating the harmony matching score between the clothing image that the user intends to purchase and the clothing image registered in the database by analyzing the clothing image that the user intends to purchase and style information of the clothing image that the user intends to purchase by using a third deep neural network model previously trained so as to calculate the harmony matching score between clothing images through analysis of the clothing images and the style information, and transmitting purchase recommendation information or purchase holding information to the user terminal based on the harmony matching score.

A clothing coordination information recommendation apparatus according to an embodiment of the present disclosure may include a classification unit for classifying style information through analysis of collected clothing image, a calculation unit for calculating a harmony matching score between clothing images included in the classified style information or a TPO matching score on a time, a place, and an occasion of each of the clothing images and registering the calculated score in the database, a voice recognition unit for recognizing a clothing coordination request speech voice received from a user, and confirming the speech intention of the clothing coordination request speech voice of the user, and a recommendation unit for recommending clothing coordination information corresponding to the speech intention, based on the harmony matching score or the TPO matching score registered in the database.

According to the clothing coordination information recommendation apparatus according to the present embodiment, it is possible to construct the database for each style by collecting clothing information actually owned by the user from the clothing processing home appliance and/or the user terminal, and to recommend the clothing coordination information to be suitable for the user request based on the clothing information actually owned by the user itself, thereby helping the user to wear the clothing.

In addition, the classification unit may include a first classification unit for classifying appearance style information of the collected clothing image by analyzing a feature vector extracted from the collected clothing image by using a first deep neural network model previously trained so as to classify appearance style information of a clothing image by analyzing a feature vector extracted from the clothing image, and a second classification unit for classifying abstract style information of the collected clothing image by analyzing the appearance style information generated from the collected clothing image by using a second deep neural network model previously trained so as to classify abstract style information of a clothing image by analyzing the appearance style information of the clothing image.

In addition, the voice recognition unit may be configured to extract information on at least one of the time, the place, or the occasion to wear the coordinated clothing from the clothing coordination request speech voice received from the user, and the recommendation unit may be configured to recommend the clothing coordination information corresponding to the speech intention based on the extracted information on at least one of the time, the place, or the occasion and the TPO matching score of each of the clothing images stored in the database.

In addition, the calculation unit may be configured to calculate the harmony matching score of the collected clothing image on a clothing image owned by the user and to register the harmony matching score in the database, based on the similarity between style information including appearance style information and abstract style information on the collected clothing image, and style information on the clothing image owned by the user registered in the database.

In addition, the calculation unit may be configured to calculate the harmony matching score of the collected clothing image on an image for which the clothing coordination has been completed and to register the harmony matching score in the database, based on the similarity between the collected clothing image, and the image for which the clothing coordination has been completed and which has been collected from clothing shopping malls.

In addition, the recommendation unit may be configured to recommend the clothing coordination information in the order of the highest score combination of the harmony matching scores of the clothing images registered in the database, based on the speech intention of the clothing coordination request speech voice.

In addition, the clothing coordination information recommendation apparatus according to the present embodiment may further include a collection unit for collecting weather information of a date when the clothing coordination request speech voice is received, and the recommendation unit may be configured to recommend the clothing coordination information in the order of the highest score combination of the harmony matching scores of the clothing images registered in the database, based on the speech intention of the clothing coordination request speech voice and the weather information of the date when the clothing coordination request speech voice is received.

In addition, the clothing coordination information recommendation apparatus according to the present embodiment may further include an induction unit for collecting the clothing image that the user intends to purchase from a user terminal, calculating the harmony matching score between the clothing image that the user intends to purchase and the clothing image registered in the database by analyzing the clothing image that the user intends to purchase and style information of the clothing image that the user intends to purchase by using a third deep neural network model previously trained so as to calculate the harmony matching score between clothing images through analysis of the clothing images and the style information, and transmitting purchase recommendation information or purchase holding information to the user terminal based on the harmony matching score.

In addition, the classification unit, the calculation unit, the voice recognition unit, the recommendation unit, the first classification unit, the second classification unit, and the other units may be implemented as operations of a processor included in the clothing coordination information recommendation apparatus according to the present disclosure.

In addition, other methods and other systems for implementing the present disclosure, and a computer-readable medium for storing a computer program for executing the above method may be further provided.

Other aspects, features, and advantages will become apparent from the following drawings, claims, and detailed description of the disclosure.

According to the present disclosure, it is possible to construct the database for each style by collecting clothing information actually owned by the user from the clothing processing home appliance and/or the user terminal, and to recommend the clothing coordination information to be suitable for the user request based on the clothing information actually owned by the user itself, thereby helping the user to wear the clothing.

In addition, it is possible to construct the database for each style by collecting the clothing information actually owned by the user from the clothing processing home appliance and/or the user terminal, and to recommend the clothing coordination information to be suitable for the user request based on the clothing information actually owned by the user itself and the TPO information, thereby helping the user to wear the clothing.

In addition, it is possible to construct the database for each style by collecting the clothing information actually owned by the user from the clothing processing home appliance and/or the user terminal, and to recommend the clothing coordination information to be suitable for the user request based on the clothing information actually owned by the user itself, the weather information, and the TPO information, thereby helping the user to wear the clothing.

In addition, it is possible to notify the user of a harmony matching score by calculating the harmony matching score between the clothing information actually owned by the user itself and the clothing image that the user intends to purchase when receiving the clothing image that the user intends to purchase from the user terminal, thereby inducing the user to purchase the clothing that goes with the clothing actually owned by the user itself to prevent over consumption.

In addition, the clothing appliance itself is a mass-produced uniform product, but the user recognizes the clothing processing apparatus as a personalized apparatus, thereby implementing the effect of a user-customized product.

The effects of the present disclosure are not limited to those mentioned above, and other effects not mentioned may be clearly understood by those skilled in the art from the following description.

BRIEF DESCRIPTION OF THE DRAWINGS

FIG. 5 is a diagram showing an example where the clothing coordination information recommendation apparatus of FIG. 3 generates a clothing image collected from the clothing processing home appliance and the user terminal.

DETAILED DESCRIPTION

Figure 1:
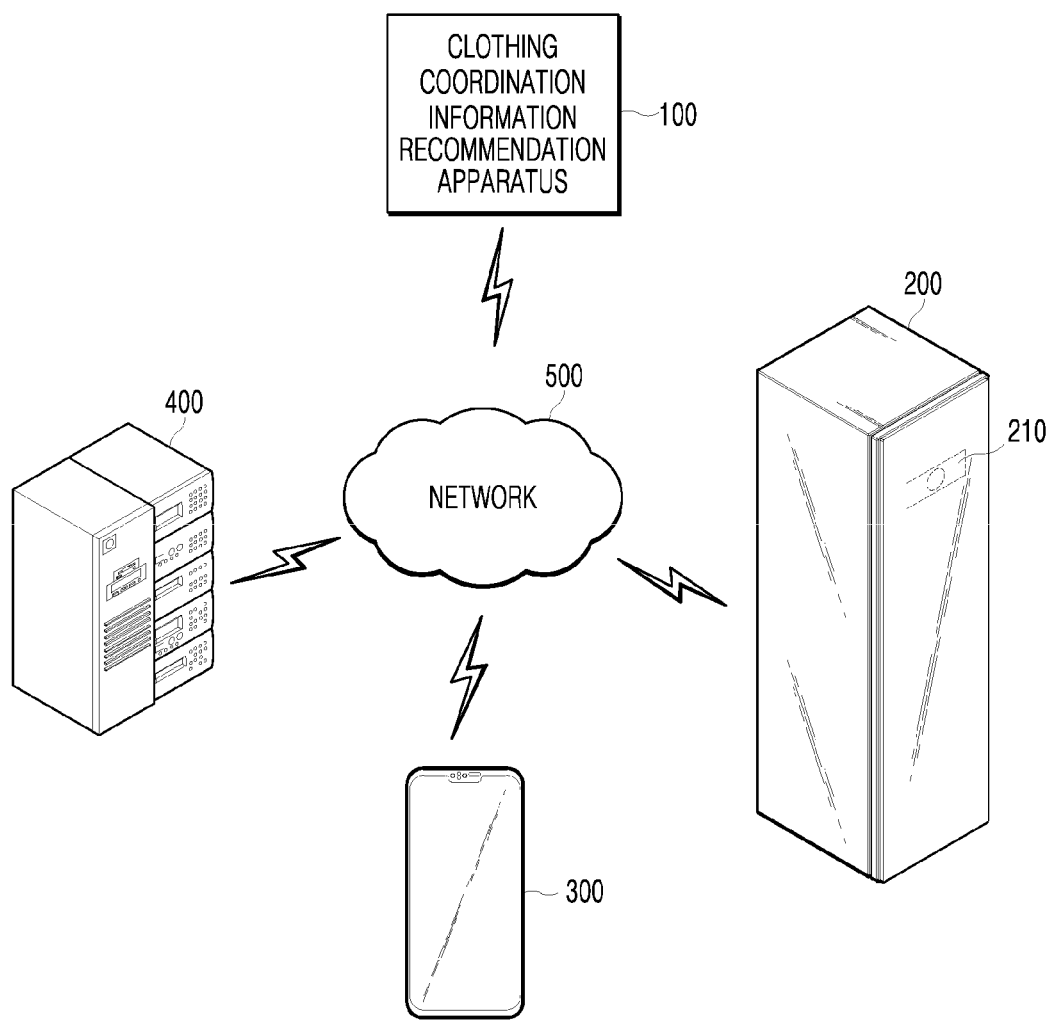
FIG. 1 is an exemplary diagram showing an example of clothing coordination information recommendation environment including a clothing coordination information recommendation apparatus, a clothing processing home appliance, a user terminal, a server, and a network for mutually connecting them according to an embodiment of the present disclosure.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has." "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings.

Like reference numerals designate like elements throughout the specification, and overlapping descriptions of the elements will not be provided:

FIG. 1 is an exemplary diagram showing an example of clothing coordination information recommendation environment including a clothing coordination information recommendation apparatus, a clothing processing home appliance, a user terminal, a server, and a network for mutually connecting them according to an embodiment of the present disclosure. Referring to FIG. 1, the clothing coordination information recommendation environment may include a clothing coordination information recommendation apparatus 100, a clothing processing home appliance 200, a user terminal 300, a server 400, and a network 500.

The clothing coordination information recommendation apparatus 100 may classify one or more style information by analyzing clothing image information collected from the clothing processing home appliance 200 and/or the user terminal 300.

Here, the style information may include appearance style information on the collected clothing image information, and abstract style information on the collected clothing image information. Here, the appearance style information may include visible substantial information such as a color, a material, a length, presence or absence of a collar, presence or absence of a pattern, etc. In addition, the abstract style information may include emotional information that may be felt when the corresponding clothing has been worn, such as neatness, softness, everyday, summer, etc. For example, when the collected clothing image is a white short-sleeved round T-shirt, the clothing coordination information recommendation apparatus 100 may classify white, T-shirt, short-sleeved, round, etc. as the appearance style information, and classify neatness, cleanness, ordinary, gentle, summer, everyday, campus look, etc. as the abstract style information. The clothing coordination information recommendation apparatus 100 may store it in the database 140 as meta information by tagging the classified style information on the collected clothing image information.

The clothing coordination information recommendation apparatus 100 may calculate a harmony matching score based on the style information between the clothing images and register it in the database 140. The clothing coordination information recommendation apparatus 100 may calculate a harmony matching level based on similarity and compatibility on the style information between the clothing images, and calculate the harmony matching score on style by utilizing a siamese network technology.

In addition, the clothing coordination information recommendation apparatus 100 may register a TPO matching score in the database by calculating the TPO matching score for a time, a place, and an occasion of the collected clothing image. Here, since different times, places, and occasions may be applied to each clothing image, the TPO matching score may be calculated by applying a higher weight to a more important element of the time, the place, and the occasion. For example, the style information of a green coat 710 shown in FIG. 7 may include the style information such as autumn, party, and colorful, and the TPO matching score may be calculated by applying a higher weight to a fall as a time and a party as an occasion.

The clothing coordination information recommendation apparatus 100 may receive and recognize a clothing coordination request speech voice received from a user, confirm the speech intention of the clothing coordination request speech voice of the user, and recommend the clothing coordination information corresponding to the speech intention based on the harmony matching score or the TPO matching score registered in the database 140.

As an optional embodiment, the clothing coordination information recommendation apparatus 100 may receive a clothing image that the user intends to purchase from the user terminal 300, calculate the harmony matching score between the clothing image that the user intends to purchase and the clothing image registered in the database 140, and transmit purchase recommendation information or purchase holding information to the user terminal 300 based on the harmony matching score.

The clothing processing home appliance 200 may be collectively referred to as an apparatus for removing contaminants stained on clothing by applying water into a processing chamber receiving the clothing, drying wet clothing by applying dry air thereto, or refreshing (e.g., removing wrinkle or odor) the clothing by blowing air or applying steam. In addition, the clothing processing home appliance 200 may include a camera 210 for generating a clothing image, the camera 210 may be provided inside and/or outside the clothing processing home appliance 200. The clothing coordination information recommendation apparatus 100 may classify the style information from the clothing image collected from the clothing processing home appliance 200, calculate the harmony matching score and/or the TPO matching score with other clothing images, and register the calculated score in the database 140.

The clothing processing home appliance 200 may transmit a clothing coordination request signal to the clothing coordination information recommendation apparatus 100, receive a clothing coordination information recommendation result as an output result from the clothing coordination information recommendation apparatus 100, and transmit feedback information of the user on the output result to the clothing coordination information recommendation apparatus 100.

The user terminal 300 may receive a service for driving or controlling the clothing coordination information recommendation apparatus 100 through an authentication process after accessing a driving application of the clothing coordination information recommendation apparatus or a driving site of the clothing coordination information recommendation apparatus. In the present embodiment, the user terminal 300 that has completed the authentication process may drive the clothing coordination information recommendation apparatus 100, and control an operation of the clothing coordination information recommendation apparatus 100.

In the present embodiment, the user terminal 300 includes a camera (not shown) capable of capturing clothing images, and the clothing coordination information recommendation apparatus 100 may classify style information from the clothing image collected from the user terminal 300, calculate the harmony matching score and/or the TPO matching score with other clothing images, and register the harmony matching score in the database 140. The user terminal 300 may transmit a clothing coordination request signal to the clothing coordination information recommendation apparatus 100, receive the clothing coordination information recommendation result as an output result from the clothing coordination information recommendation apparatus 100, and transmit feedback information of the user on the output result to the clothing coordination information recommendation apparatus 100. In addition, the user terminal 300 may transmit a clothing image that the user intends to purchase to the clothing coordination information recommendation apparatus 100, and receive purchase recommendation information or purchase holding information according to the calculated result of the harmony matching score between the clothing image that the user intends to purchase and the clothing image registered in the database from the clothing coordination information recommendation apparatus 100.

In the present embodiment, the user terminal 300 may include various kinds of user-controllable devices, such as a desktop computer, a smartphone, a laptop, a tablet PC, a smart TV, a mobile phone, a personal digital assistant (PDA), a media player, a micro server, a global positioning system (GPS) device, an E-book terminal, a digital broadcast terminal, a navigation device, a kiosk, an MP3 player, a digital camera, home appliances, and other mobile or non-mobile computing devices, without being limited thereto. In addition, the user terminal 300 may be a wearable terminal including a communication function and a data processing function, such as a watch, glasses, a headband, and a ring. However, the user terminal 300 is not limited thereto, and all kinds of terminals capable of web-browsing may also be applied to the present disclosure.

The server 400 may be a database server for providing big data required for applying various artificial intelligence algorithms and data for operating the clothing coordination information recommendation apparatus 100. In addition, the server 400 may include a web server or an application server capable of remotely controlling the operation of the clothing coordination information recommendation apparatus 100 by using a driving application of a personal style database building apparatus or a driving web browser of the personal style database building apparatus installed in the user terminal 300.

Here, the artificial intelligence (AI), which is an area of computer engineering and information technology for studying methods for enabling computers to mimic thinking, learning, self-development, or the like that may be carried out with human intelligence, may represent enabling computers to mimic human intelligent behavior.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. Specifically, the Machine Learning may be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

The server 400 may classify the style information through analysis of the clothing image collected from the clothing coordination information recommendation apparatus 100. The server 400 may calculate the harmony matching score between the clothing images included in the classified style information or the TPO matching score on a time, a place, and an occasion of each of the clothing images, and transmit the calculated score to the clothing coordination information recommendation apparatus 100. The server 400 may perform voice recognition processing by receiving the clothing coordination request speech voice of the user from the clothing coordination information recommendation apparatus 100, and confirm the speech intention of the clothing coordination request speech voice of the user and transmit the speech intention to the clothing coordination information recommendation apparatus 100. The server 400 may transmit the clothing coordination information recommendation result corresponding to the speech intention to the clothing coordination information recommendation apparatus 100 based on the harmony matching score or the TPO matching score.

In the present embodiment, according to the processing capability of the clothing coordination information recommendation apparatus 100, at least some of the classification of the style information, the calculation of the harmony matching score and/or the TPO matching score, the confirmation of the speech intention on the coordination request speech voice of the user, and the recommendation of the clothing coordination information, which are performed by the server 400, may be performed by the clothing coordination information recommendation apparatus 100.

The network 500 may serve to connect the clothing coordination information recommendation apparatus 100, the clothing processing home appliance 200, the user terminal 300, and the server 400. The network 500 may include a wired network such as a Local Area Network (LAN), a Wide Area Network (WAN), a Metropolitan Area Network (MAN), and an Integrated Services Digital Network (ISDN), and a wireless network such as wireless LAN, Code Division Multiple Access (CDMA), Bluetooth®, and satellite communication, without being limited thereto. In addition, the network 500 may transmit and receive information via short range communication and/or long range communication. Here, the short-range communications may include Bluetooth, radio frequency identification (RFID), infrared data association (IrDA), ultra-wideband (UWB), ZigBee, and wireless fidelity (Wi-Fi) technology.

The long-distance communications may include code division multiple access (CDMA), frequency division multiple access (TDMA), time division multiple access (TDMA), orthogonal frequency division multiple access (OFDMA), and single carrier frequency division multiple access (SC-FDMA) technology.

The network 500 may include a connection of network elements such as a hub, a bridge, a router, a switch, and a gateway. The network 500 may include a public network such as the Internet, a private network such as a secure enterprise private network, and one or more interconnected networks, such as a multiple network environment. Access to the network 500 may be provided via one or more wired or wireless access networks. Moreover, the network 500 may support Internet of Things (IoT) for enabling separate constituent elements to communicate with each other, and/or 5G communication.

Figure 2:
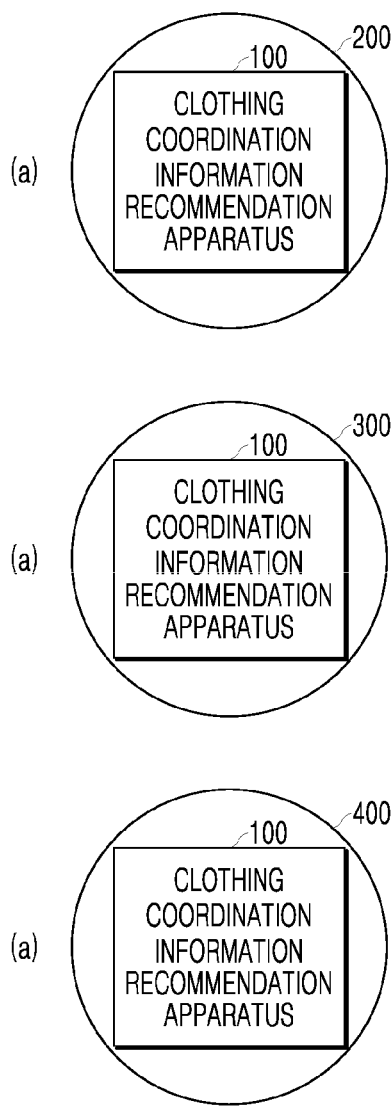
FIG. 2 is an exemplary diagram showing clothing coordination information recommendation environment showing an example of implementing a clothing coordination information recommendation apparatus according to another embodiment of the present disclosure.

FIG. 2 is an exemplary diagram showing a clothing coordination information recommendation environment showing an example of implementing the clothing coordination information recommendation apparatus according to another embodiment of the present disclosure. Hereinbelow, the common parts previously described with reference to FIG. 1 will not be described, so as to avoid repetitive description.

Referring to FIGS. 2A to 2C, the clothing coordination information recommendation apparatus 100 may be included in one of the clothing processing home appliance 200, the user terminal 300, and the server 400. Various methods may be used to include the clothing coordination information recommendation apparatus 100 in one of the clothing processing home appliance 200, the user terminal 300, and the server 400. As a specific embodiment, the clothing coordination information recommendation apparatus 100 may be installed in one of the clothing processing home appliance 200, the user terminal 300, and the server 400 through the network 500. For example, the clothing coordination information recommendation apparatus 100 may be installed in one of the clothing processing home appliance 200, the user terminal 300, and the server 400 in one application form. As another specific embodiment, the clothing coordination information recommendation apparatus 100 may also be installed in one of the clothing processing home appliance 200, the user terminal 300, and the server 400 through offline. However, this is an exemplary form and the present disclosure is not limited thereto, and may include the case where the clothing coordination information recommendation apparatus 100 may be installed in various forms in one of the clothing processing home appliance 200, the user terminal 300, and the server 400.

Figure 3:
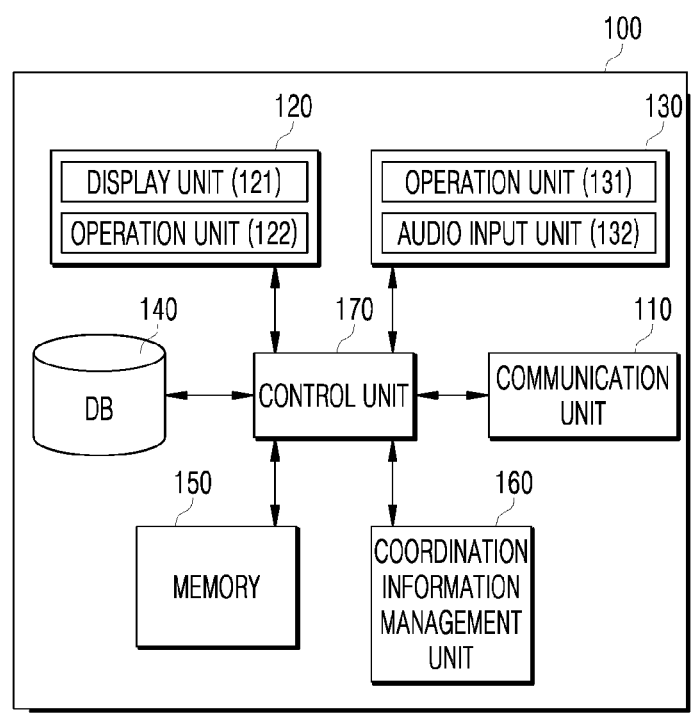
FIG. 3 is a diagram for schematically explaining a detailed configuration of the clothing coordination information recommendation apparatus of FIG. 1.

FIG. 3 is a diagram for schematically explaining a detailed configuration of the clothing coordination information recommendation apparatus of FIG. 1. Descriptions which overlap with the above descriptions related to FIGS. 1 and 2 are not provided below.

Referring to FIG. 3, the clothing coordination information recommendation apparatus 100 may include a communication unit 110, a user interface unit 120 including a display unit 121 and an operation unit 122, an audio processing unit 130 including an audio input unit 131 and an audio output unit 132, the database 140, a memory 150, a coordination information management unit 160, and a control unit 170.

The communication unit 110 may provide a communication interface required for providing a transmission and reception signal between the clothing coordination information recommendation apparatus 100, the clothing processing home appliance 200, the user terminal 300, and/or the server 400 in the form of packet data in interlock with the network 500. In addition, the communication unit 110 may serve to receive a predetermined information request signal from the clothing processing home appliance 200 and/or the user terminal 300, and serve to transmit the information processed by the clothing coordination information recommendation apparatus 100 to the clothing processing home appliance 200 and/or the user terminal 300. In addition, the communication unit 110 may transmit a predetermined information request signal from the clothing processing home appliance 200 and/or the user terminal 300 to the server 400, receive a response signal processed by the server 400, and transmit the response signal to the clothing processing home appliance 200 and/or the user terminal 300 by. In addition, the communication unit 110 may be a device including hardware and software required for transmitting and receiving a signal such as a control signal or a data signal through a wired or wireless connection with another network device.

Furthermore, the communication unit 110 may support a variety of object-to-object intelligent communication, for example, Internet of things (IoT), Internet of everything (IoE), and Internet of small things (IoST), and may support, for example, machine to machine (M2M) communication, vehicle to everything (V2X) communication, and device to device (D2D) communication.

The display unit 121 of the user interface unit 120 may display the driving state of the clothing coordination information recommendation apparatus 100 under the control of the control unit 170. According to an embodiment, the display unit 121 may form a layered structure with a touch pad so as to be configured as a touch screen. In this case, the display unit 121 may also be used as the operation unit 122 capable of inputting information in response to a touch of a user. To this end, the display unit 121 may be configured with a touch-sensitive display control unit or other various input and output control units. As an example, the touch recognition display control unit may provide an output interface and an input interface between a device and a user. The touch-sensitive display control unit may transmit and receive electric signals to and from the control unit 170.

Additionally, the touch recognition display control unit may display a visual output to the user, and the visual output may include output of text, graphics, images, video, and combinations thereof. The display unit 121 may be a predetermined display member such as, for example, a touch-sensitive organic light emitting display (OLED), liquid crystal display (LCD), or light emitting display (LED).

The operation unit 122 of the user interface unit 120 may have a plurality of operation buttons (not shown) to transmit signals corresponding to the buttons to the control unit 170. This operation unit 122 may be configured with a sensor, button, or switch structure capable of recognizing a touch or pressing operation of the user. In the present embodiment, the operation unit 122 may confirm various information related to the driving of the clothing coordination information recommendation apparatus 100 displayed on the display unit 121, or transmit an operation signal operated by the user for change to the control unit 170. In the present embodiment, when the clothing coordination information recommendation apparatus 100 is included in the clothing processing home appliance 200 and/or the user terminal 300, the user interface unit 120 may be replaced with a display unit (not shown) and an operation unit (not shown) of the user terminal 300.

The audio input unit 131 of the audio processing unit 130 may receive speech information from the user and transmit the speech information to the control unit 170, and the control unit 170 may control to perform a voice recognition processing by transmitting the speech information of the user to the coordination information management unit 160. To this end, the audio input unit 131 may be provided with at least one microphone (not shown). Furthermore, the audio input unit 131 may be provided with a plurality of microphones (not shown) to more accurately receive a spoken utterance. Here, the plurality of microphones may be spaced apart from each other so as to be arranged at different positions, and may process a received spoken utterance of the user into an electric signal.

As an optional embodiment, the audio input unit 131 may use various noise removing algorithms for removing noise generated in the process of receiving the speech information of the user. As an optional embodiment, the audio input unit 131 may include various components for processing a speech information signal, such as a filter (not shown) for removing noise when receiving the speech information of the user, or an amplifier (not shown) for amplifying and outputting a signal output from the filter.

The audio output unit 132 of the audio processing unit 130 may output as an audio a notification message such as a warning sound, an operation mode, an operation state, an error state, etc., a processed result corresponding to a voice command included in the speech information of the user, etc. under the control of the control unit 170. In the present embodiment, the audio output unit 132 may output the clothing coordination information recommendation result generated by the coordination information management unit 160. The audio output unit 132 may convert an electric signal received from the control unit 170 into an audio signal, and may output the audio signal. To this end, the audio output unit may be provided with, for example, a speaker.

In the present embodiment, when the clothing coordination information recommendation apparatus 100 is included in the clothing processing home appliance 200 and/or the user terminal 300, the audio processing unit 130 may be replaced with an audio input unit (not shown) and an audio output unit (not shown) of the clothing processing home appliance 200 and/or the user terminal 300.

The database 140 may include a management database for storing the information collected and generated by the clothing coordination information recommendation apparatus 100. Here, the management database may store clothing image information collected from the clothing processing home appliance 200 and/or the user terminal 300, style information including appearance style information and/or abstract style information corresponding to the collected clothing image information, the harmony matching score information between the any one clothing image and other clothing images, and the TPO matching score information of the clothing image.

The database 140 may further include a user database for storing user information. Here, the user database may store the user information that requests the clothing coordination information and is recommended. Here, the user information may include: basic information on a user, such as name, affiliation, personal data, gender, age, contact information, email, and address; authentication (login) information such as an ID (or email) and a password; and access-related information such as an access country, an access location, information about a device used for access, and an accessed network environment.

The memory 150 may store various information required for the operation of the clothing coordination information recommendation apparatus 100, for example, a first deep neural network model and a second deep neural network model for classifying style information, and a third deep neural network model for calculating a harmony matching score between the clothing image that the user intends to purchase and the clothing image registered in the database 140, and may include a volatile or nonvolatile recording medium. In addition, the memory 150 may store control software capable of operating the clothing coordination information recommendation apparatus 100. Furthermore, the memory 150 may store a preset start word for determining whether a start word is present from the voice of the user. The start word may be set by a manufacturer. For example, "Hi, Styler" may be set as the start word, and may be set and changed by the user. Such a starting word is input to activate a voice recognition function of the clothing coordination information recommendation apparatus 100, and the clothing coordination information recommendation apparatus 100 having recognized the starting word spoken by the user may switch to the activation state of the voice recognition function.

Here, the memory 150 may include magnetic storage media or flash storage media, but the scope of the present disclosure is not limited thereto. The memory 170 as described above may include magnetic storage media or flash storage media, but the scope of the present disclosure is not limited thereto. This memory 150 may include an internal memory and an external memory, and may include: a volatile memory such as a DRAM, SRAM, or SDRAM; a non-volatile memory such as a one-time programmable ROM (OTPROM), PROM, EPROM, EEPROM, mask ROM, flash ROM, NAND flash memory, or NOR flash memory; and a storage device such as an HDD or a flash drive such as an SSD, compact flash (CF) card, SD card, micro-SD card, mini-SD card, Xd card, or a memory stick.

Here, the simple voice recognition may be performed by the clothing coordination information recommendation apparatus 100, and the high-level voice recognition such as natural language processing may be performed by the server 400. For example, when the user voice includes a predetermined starting word, the clothing coordination information recommendation apparatus 100 may activate a voice recognition function, and switch to a state for receiving a voice command (clothing coordination request speech voice) from the user. In this case, the clothing coordination information recommendation apparatus 100 may perform only a voice recognition process up to whether a voice of the starting word is input, and the voice recognition of the user command afterwards may be performed through the server 400. Since the system resource of the clothing coordination information recommendation apparatus 100 is limited, complex natural language recognition and processing may be performed through the server 400.

The coordination information management unit 160 may classify one or more style information by analyzing the clothing image information collected from the clothing processing home appliance 200 and/or the user terminal 300. The coordination information management unit 160 may calculate a harmony matching score between the clothing images included in the style information and register the harmony matching score in the database 140. The coordination information management unit 160 may calculate the TPO matching score for a time, a place, and an occasion of each of the clothing images and register the TPO matching score in the database 140. The coordination information management unit 160 may receive and recognize the clothing coordination request speech voice received from the user, confirm the speech intention of the clothing coordination request speech voice of the user, and recommend the clothing coordination information corresponding to the speech intention based on the harmony matching score and/or the TPO matching score of the clothing registered in the database 140.

In addition, when receiving a clothing image that the user intends to purchase from the user terminal 300, the coordination information management unit 160 may calculate a harmony matching score between the clothing image that the user intends to purchase and the clothing image registered in the database 140, and transmit purchase recommendation information or purchase holding information to the user terminal 300 based on the harmony matching score.

In the present embodiment, the coordination information management unit 160 may perform learning in connection with the control unit 170 or receive a learning result from the control unit 170. In the present embodiment, the coordination information management unit 160 may also be provided outside the control unit 170 as shown in FIG. 3, or also provided inside the control unit 170 to operate as the control unit 170, or also provided inside of the server 400 of FIG. 1. Hereinafter, a detailed description of the coordination information management unit 160 will be described with reference to FIG. 4.

The control unit 170 may be a kind of central processing unit and may control the overall operation of the clothing coordination information recommendation apparatus 100 by driving the control software mounted in the memory 150. The control unit 170 may include any type of device capable of processing data, such as a processor. Here, the term "processor" may represent, for example, a hardware-embedded data processing device having a physically structured circuit to execute functions expressed as instructions or codes included in a program. Examples of the hardware-embedded data processing device may include a microprocessor, a central processing unit (CPU), a processor core, a multiprocessor, an application-specific integrated circuit (ASIC), and a field programmable gate array (FPGA), but the scope of the present disclosure is not limited thereto.

In the present embodiment, the control unit 170 may perform machine learning such as Deep Learning for the collected clothing image so that the clothing coordination information recommendation apparatus 100 classifies optimal style information, and recommends optimal clothing coordination information in response to the clothing coordination request speech voice of the user, and the memory 150 may store data used for machine learning, result data, etc.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network may continuously update the weight values through learning. Furthermore, methods such as back propagation may be used in training the artificial neural network.

As described above, the control unit 170 may be provided with an artificial neural network and perform machine learning-based user recognition and user's voice recognition using received audio input signals as input data.

The control unit 170 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The control unit 170 may control to have a tone artificial neural network structure to be updated after learning.

Figure 4:
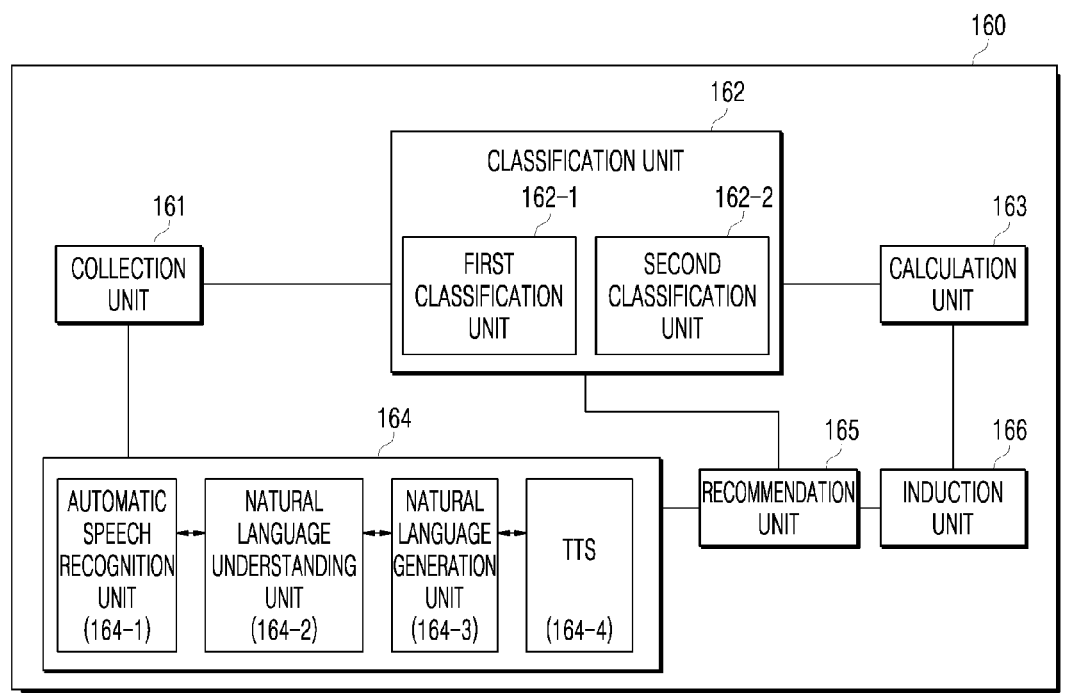
FIG. 4 is a diagram for schematically explaining a detailed configuration of a coordination information management unit in the clothing coordination information recommendation apparatus of FIG. 3.

FIG. 4 is a diagram for schematically explaining a detailed configuration of the coordinate information management unit of the clothing coordination information recommendation apparatus of FIG. 3. In the following description, a description of the portions duplicative of the description of FIGS. 1 to 3 will be omitted. Referring to FIG. 4, the coordination information management unit 160 may include a collection unit 161, a classification unit 162, a calculation unit 163, a voice recognition unit 164, a recommendation unit 165, and an induction unit 166.

The collection unit 161 may collect the clothing image photographed by the clothing processing home appliance 200 and/or the user terminal 300 from the clothing processing home appliance 200 and/or the user terminal 300.

As an optional embodiment, the collection unit 161 may collect the clothing image that the user intends to purchase from the user terminal 300. When the user finds favorite clothing during offline shopping, the clothing image that the user intends to purchase may be generated when the user photographs the corresponding clothing image by using the user terminal 300. When the user may execute the driving application of the clothing coordination information recommendation apparatus mounted in the user terminal 300, select a menu for receiving the purchase recommendation information or the purchase holding information, and then upload the clothing image that the user intends to purchase, the collection unit 161 may collect the clothing image that the user intends to purchase.

As an optional embodiment, the collection unit 161 may collect weather information on a date when the clothing coordination request speech voice is received from the user and/or weather information on a date when the user wears the clothing included in the clothing coordination request speech voice. For this purpose, the collection unit 161 may transmit a weather information request signal for a specific date to a weather information providing apparatus (not shown) for providing weather information through the communication unit 110 and the network 500 and collect a weather information response signal on the specific date through the communication unit 110 and the network 500 from the weather information providing apparatus.

The classification unit 162 may classify one or more style information by analyzing clothing image information collected by the collection unit 161. In the present embodiment, the classification unit 162 may include a first classification unit 162-1 and a second classification unit 162-2.

The first classification unit 162-1 may classify the appearance style information including a color, a material, a length, presence or absence of a collar, presence of absence of a pattern, etc. with respect to the collected clothing image information. The first classification unit 162-1 may tag the classified appearance style information on the collected clothing image information and store the classified appearance style information in the database 140 as meta information. In the present embodiment, the first classification unit 162-1 may classify the appearance style information of the collected clothing image by analyzing a specific vector extracted from the collected clothing image by using the first deep neural network model previously trained so as to classify the appearance style information of the clothing by analyzing a specific vector extracted from the clothing image.

The second classification unit 162-2 may classify the abstract style information including neatness, cleanness, ordinary, softness, summer, daily life, campus look, etc. with respect to the collected clothing image information. The second classification unit 162-2 may tag the classified abstract style information on the collected clothing image information and store the classified abstract style information in the database 140 as meta information. In the present embodiment, the second classification unit 162-2 may classify the abstract style information of the collected clothing image by analyzing the appearance style information generated from the collected clothing image by using the second deep neural network model previously trained so as to classify the abstract style information of the clothing by analyzing the appearance style information of the clothing.

The calculation unit 163 may calculate a harmony matching score between the clothing images included in the classified style information, or a TPO matching score for a time, a place, and an occasion of each of the clothing images, and register the calculated score in the database 140.

The calculation unit 163 may calculate the harmony matching score of the collected clothing image for the clothing image owned by the user based on the similarity between the style information including the appearance style information and the abstract style information on the collected clothing image, and the style information on the clothing image owned by the user registered in the database 140. In addition, the calculation unit 163 may calculate the harmony matching score of the collected clothing image on an image for which clothing coordination has been completed based on the similarity between the collected clothing image and the image for which the clothing coordination has been completed and which has been collected from a clothing shopping mall.

Here, the similarity calculation method may use a method such as a k-nearest neighbors algorithm, a naive bayes classifier, or a support vector machine. In addition, the similarity calculation method may use a siamese network, and the siamese network may be a neural network that may be used in a recognizer having insufficient training data for each category. The siamese network may learn the similarity calculation from data. The siamese network may include two or more networks for at least partially sharing a weight, and a comparison module (not shown) for receiving an output from the neural networks. At least two images may be input to the siamese network. Here, the two images may include a clothing image collected by the collection unit 161 and a clothing image owned by the user previously stored in the database 140. In addition, the two images may include a clothing image collected by the collection unit, and an image for which the clothing coordination has been completed and which has been collected from the outside (e.g., clothing shopping mall). The siamese network may output a result that has determined the similarity of two input images. For image processing, the siamese network may include two convolutional neural networks that receive an image. The two convolutional neural networks receiving the image from the siamese network may share at least a portion of the weight. Sub-networks included in the siamese network may share the weight by a weight sharing module (not shown), and since the sub-networks share the weight, the siamese network may compare by extracting a feature with a common weight for the two input images.

The calculation unit 163 may calculate a harmony matching score between the clothing image collected by applying a predetermined weight and the previously stored clothing image in response to the similarity between the collected clothing image and the previously stored clothing image. As an optional embodiment, the calculation unit 163 may calculate the harmony matching score between the clothing image collected by applying the predetermined weight and the image for which the clothing coordination has been completed and which has been collected from the outside in response to the similarity between the collected clothing image and the image for which the clothing coordination has been completed and which has been collected from the outside (e.g., clothing shopping mall). As an optional embodiment, the calculation unit 163 may calculate the harmony matching score between the clothing image collected by applying the predetermined weight and the previously stored clothing image in response to the similarity between style information on the collected clothing image and style information on the previously stored clothing image. As an optional embodiment, the calculation unit 163 may calculate the harmony matching score between the clothing image collected by applying the predetermined weight and the image for which the clothing coordination has been completed and which has been collected from the outside in response to the similarity between the style information on the collected clothing image and the style information on the image for which the clothing coordination has been completed and which has been collected from the outside.

In addition, the calculation unit 163 may calculate a TPO matching score for a time, a place, and an occasion of the collected clothing image and register the TPO matching score in the database 140. Here, since different times, places, and occasions may be applied to each clothing image, the TPO matching, score may be calculated by applying a higher weight to a more important element of the time, the place, and the occasion.

The voice recognition unit 164 may recognize the clothing coordination request speech voice received from the user, and confirm the speech intention of the clothing coordination request speech voice of the user. In the present embodiment, the voice recognition unit 164 may include an automatic speech recognition unit (ASR) 164-1, a natural language understanding unit 164-2, a natural language generation unit 164-3, and a text to speech (TTS) unit 164-4.

The automatic speech recognition unit 164-1 may generate a clothing coordination request text that has converted the clothing coordination request speech voice of the user received through the audio input unit 131 into a text. In the present embodiment, the automatic speech recognition unit 164-1 may perform the speech to text (STT) conversion. The automatic speech recognition unit 164-1 may convert the received clothing coordination request speech voice of the user into the clothing coordination request text. In the present embodiment, the automatic speech recognition unit 164-1 may include a speech recognition unit (not shown). The speech recognition unit may include an acoustic model and a language model. For example, the acoustic model may include vocalization-related information, and the language model may include unit phoneme information and information about a combination of the unit phoneme information. The speech recognition unit may convert the clothing coordination request speech voice of the user into the clothing coordination request text by using information related to vocalization and information on unit phoneme. Information about the acoustic model and language model may be stored, for example, an auto speech recognition database (not shown) in the auto speech recognition unit 164-1.

The natural language understanding unit 164-2 may analyze the speech intention on the clothing coordination request speech voice of the user by performing syntactic analysis or semantic analysis with respect to the clothing coordination request text. Here, the syntactic analysis may divide a query text into syntactic units (e.g., words, phrases, morphemes, etc.), and may recognize syntactic elements that the divided units have. In addition, the semantic analysis may be performed using semantic matching, rule matching, formula matching, and the like. Accordingly, the natural language understanding unit 164-2 may obtain what intent is the clothing coordination request text, or obtain a parameter required to express the intention.

The natural language generation unit 164-3 may generate the clothing coordination response text for the clothing coordination request text by using a knowledge base based on the speech intention analyzed by the natural language understanding unit 164-2.

The text-to-speech unit 164-4 may generate a clothing coordination response speech voice as a response speech voice conversion result of the clothing coordination response text of the natural language speech form generated by the natural language generation unit 164-3, and output the clothing coordination response speech voice through the audio output unit 132.

The recommendation unit 165 may recommend clothing coordination information corresponding to the speech intention of the user based on the harmony matching score and/or the TPO matching score registered in the database 140.

The recommendation unit 165 may recommend the clothing coordination information in the order of the highest score combination among the harmony matching scores of the clothes registered in the database 140, based on the speech intention of the clothing coordination request speech voice of the user.

The recommendation unit 165 may collect weather information on a date when the clothing coordination request speech voice is received from the collection unit 161, and recommend the clothing coordination information in the order of the highest score combination among the harmony matching scores of the clothing registered in the database 140 based on the speech intention of the clothing coordination request speech voice and the weather information of the date when the clothing coordination request speech voice is received.

The recommendation unit 165 may receive information on at least one of a time, a place, or an occasion to wear the coordinated clothing included in the clothing coordination request speech voice of the user from the voice recognition unit 164, and the recommendation unit 165 may recommend clothing coordination information corresponding to the speech intention based on the information on at least one of the extracted time, place, or occasion, and the TPO matching score of each of the clothing images stored in the database 140.

The induction unit 166 may receive the clothing image that the user intends to purchase from the user terminal 300 collected by the collection unit 161. The induction unit 166 may calculate the harmony matching score between the clothing image that the user intends to purchase and the clothing image registered in the database 140 by analyzing the clothing image that the user intends to purchase and the style information of the clothing image that the user intends to purchase, by using the third deep neural network model previously trained so as to calculate the harmony matching score between the clothing images by the analysis of the clothing image and the style information of the clothing image. The induction unit 166 may transmit purchase recommendation information or purchase holding information to the user terminal 300 based on the harmony matching score.

The induction unit 166 may align the calculated result of the harmony matching scores between the clothing image that the user intends to purchase and the clothing images registered in the database 140 in a descending order, and transmit the harmony matching scores and the clothing images to the user terminal 300 together. If there is a clothing image for which the harmony matching score exceeds a reference value (e.g., 70 points), the induction unit 166 may transmit purchase recommendation information for inducing a purchase of clothing that the user intends to purchase. However, when there is no clothing image for which the harmony matching score exceeds the reference value (e.g., 70 points), the induction unit 166 may transmit purchase holding information that holds the purchase of the clothing that the user intends to purchase.

FIG. 5 is a diagram showing an example of generating the clothing image collected by the clothing coordination information recommendation apparatus 100 of FIG. 3 from the clothing processing home appliance 200 and the user terminal 300. Hereinbelow, a description of the common part previously described with reference to FIG. 1 to FIG. 4 will be omitted.

Referring to FIG. 5A, the camera 210 provided in the clothing processing home appliance 200 may generate the clothing image by photographing the clothing worn by the user who has stayed in front of the clothing processing home appliance 200 for more than a predetermined time (e.g., three seconds). The clothing coordination information recommendation apparatus 100 may collect the clothing image generated by the clothing processing home appliance 200 through the network 500 and the communication unit 110.

Referring to FIG. 5B, it is possible to photograph the clothing actually owned by the user by using the camera provided in the user terminal 300, thereby generating the clothing image. The clothing coordination information recommendation apparatus 100 may collect the clothing image generated by the user terminal 300 through the network 500 and the communication unit 110.

Figure 6:
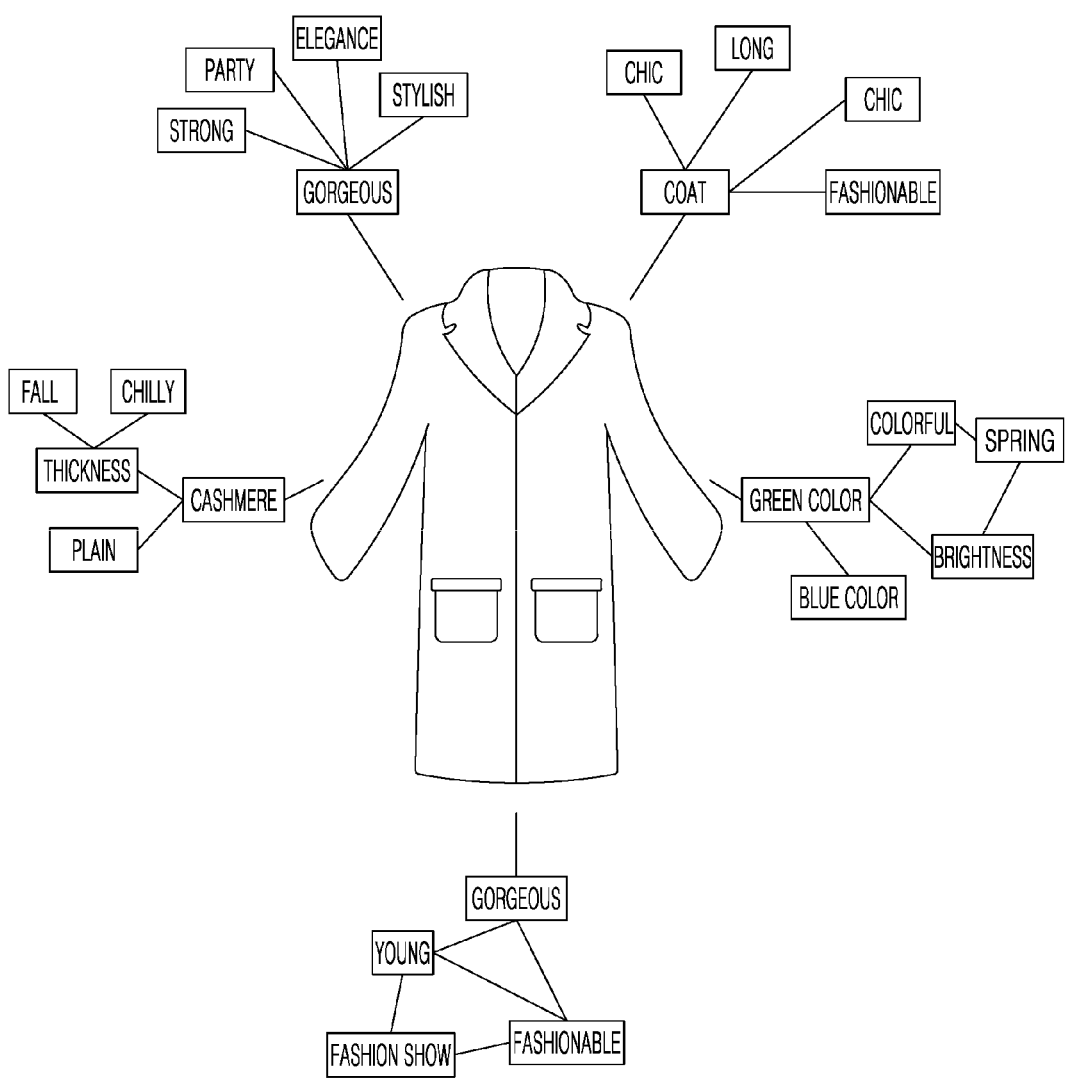
FIG. 6 is a diagram showing an example where the clothing coordination information recommendation apparatus of FIG. 3 generates style information through the analysis of the collected clothing image of the user and tags the style information on the clothing image of the user.

FIG. 6 is a diagram showing an example of generating style information through the analysis of the clothing image of the user collected by the clothing coordination information recommendation apparatus 100 of FIG. 3 and tagging the style information on the clothing image of the user. Hereinbelow, a repetitive description of the common parts previously described with reference to FIG. 1 to FIG. 5 will be omitted. Referring to FIG. 6, shown is the form in which various types of appearance style information and abstract style information are tagged on the collected clothing image information.

Figure 7:
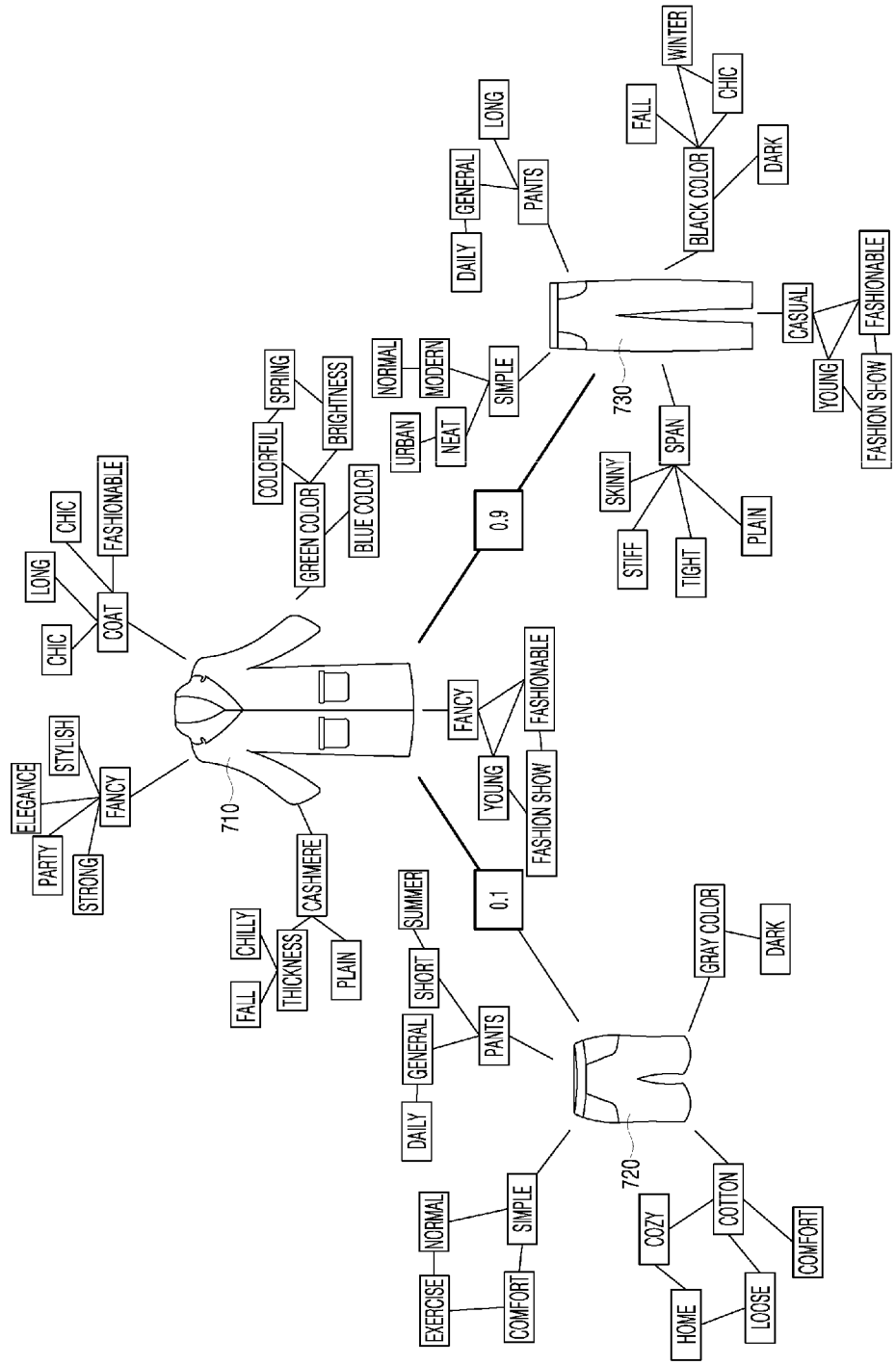
FIG. 7 is a diagram showing an example where the clothing coordination information recommendation apparatus of FIG. 3 outputs the calculated result of a harmony matching score between the collected clothing image of the user and previously stored clothing image.

FIG. 7 is a diagram showing an example where the clothing coordination information recommendation apparatus 100 of FIG. 3 outputs the calculated result of the harmony matching score between the clothing image of the user and the previously stored clothing image. In the following description, description of the parts that are the same as those in FIG. 1 to FIG. 6 will be omitted.

Referring to FIG. 7, shown is the calculated result of the harmony matching score based on the similarity between a green coat 710 collected from the clothing processing home appliance 200 and/or the user terminal 300 and a gray shorts 720 and a black formal pants 730 previously stored in the database 140. As a result of calculating the harmony matching score of the clothing coordination information recommendation apparatus 100, the harmony matching score between the green coat 710 and the gray shorts 720 is 0.1, and the harmony matching score between the green coat 710 and the black formal pants 730 is 0.9.

Referring to FIG. 7, for example, when a clothing coordination request speech voice for requesting the recommendation of the clothing going with the green coat 710 is received from the user, the clothing coordination information recommendation apparatus 100 may output the black formal pants 730 rather than the gray shorts 720 as the result of recommending the clothing coordination information based on the above-described calculated result of the harmony matching score.

Figure 8:
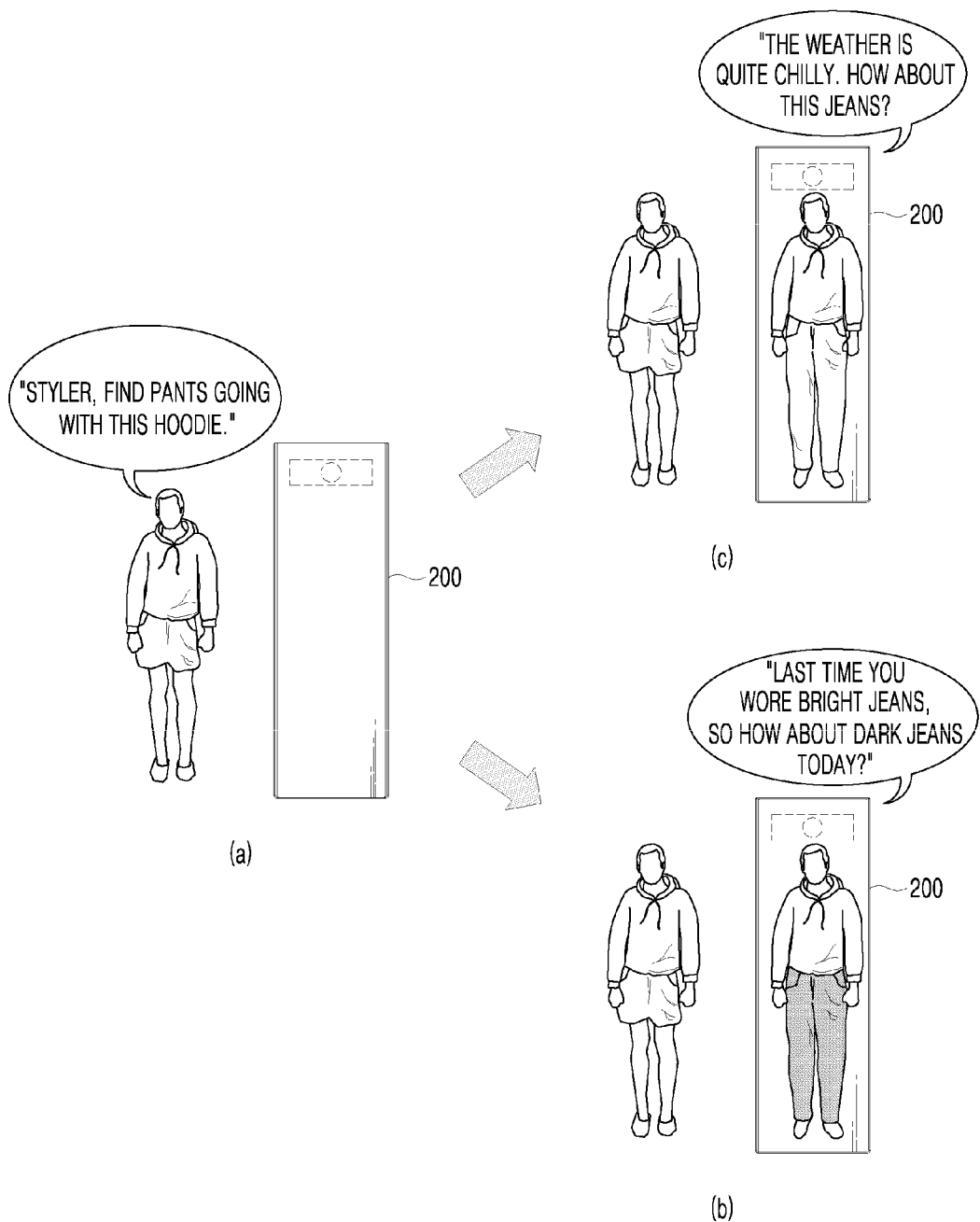
FIG. 8 is a diagram showing an example where the clothing coordination information recommendation apparatus of FIG. 3 recommends the clothing coordination information based on the clothing information actually owned by the user itself.

FIG. 8 is a diagram showing an example where the clothing coordination information recommendation apparatus 100 of FIG. 3 recommends clothing coordination information based on the clothing information actually owned by the user itself. In the following description, the common parts previously described with reference to FIG. 1 to FIG. 7 will not be described, so as to avoid repetitive description.

Referring to FIG. 8A, the clothing coordination information recommendation apparatus 100 that receives a clothing coordination request speech voice, that is, a speech voice for requesting the finding of pants going with the currently worn hoodie of the user from the clothing processing home appliance 200 may confirm the speech intention of the user.

FIG. 8B is a diagram showing an example where the clothing coordination information recommendation apparatus 100 recommends clothing coordination information corresponding to the speech intention of the user based on the calculated result of the harmony matching score stored in the database 140 corresponding to the speech intention of the user.

FIG. 8C is a diagram showing an example where the clothing coordination information recommendation apparatus 100 recommends the clothing coordination information corresponding to the speech intention of the user based on the calculated result of the harmony matching score stored in the database 140 corresponding to the speech intention of the user and the weather information of a date when the clothing coordination request speech voice is received.

Figure 9:
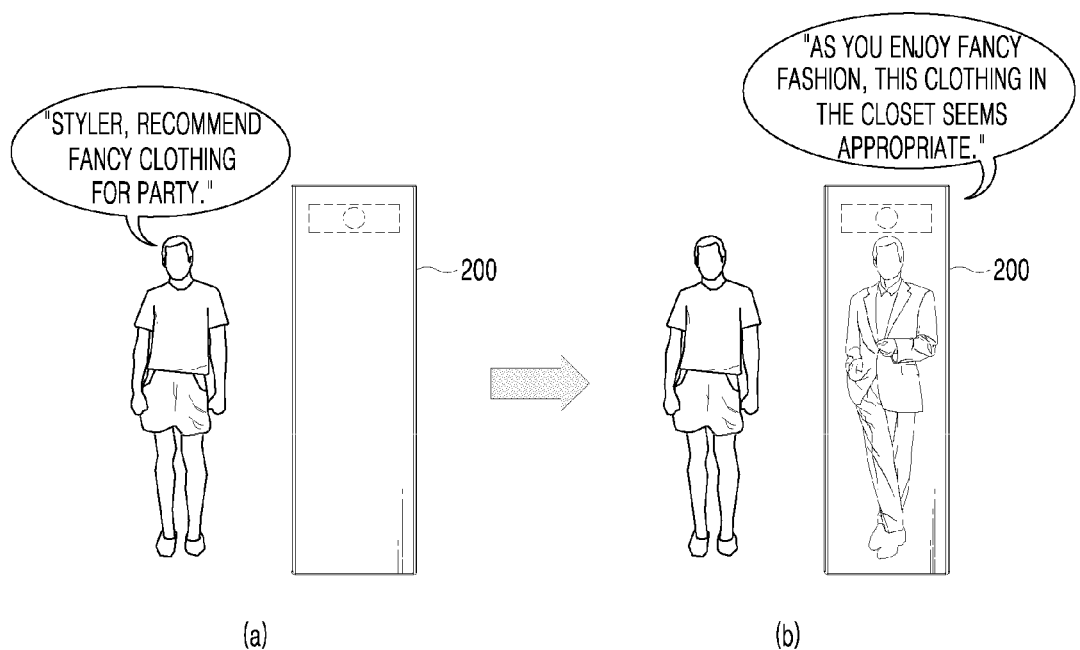
FIG. 9 is a diagram showing an example where the clothing coordination information recommendation apparatus of FIG. 3 recommends the clothing coordination information based on the occasion where the user wears the clothing.

FIG. 9 is a diagram showing an example where the clothing coordination information recommendation apparatus of FIG. 3 recommends clothing coordination information based on an occasion where the user will wear clothing. In the following description, the common parts previously described with reference to FIG. 1 to FIG. 8 will not be described, so as to avoid repetitive description.

Referring to FIG. 9A, the clothing coordination information recommendation apparatus 100 that has received the clothing coordination request speech voice, that is, a speech voice for requesting the recommendation of the colorful clothing going with a party of the user from the clothing processing home appliance 200 may confirm the speech intention of the user.

FIG. 9B is a diagram showing an example where the clothing coordination information recommendation apparatus 100 recommends clothing coordination information corresponding to the speech intention of the user based on the result of calculating the TPO matching score on the time, the place, and the occasion stored in the database 140 corresponding to the speech intention of the user.

Figure 10:
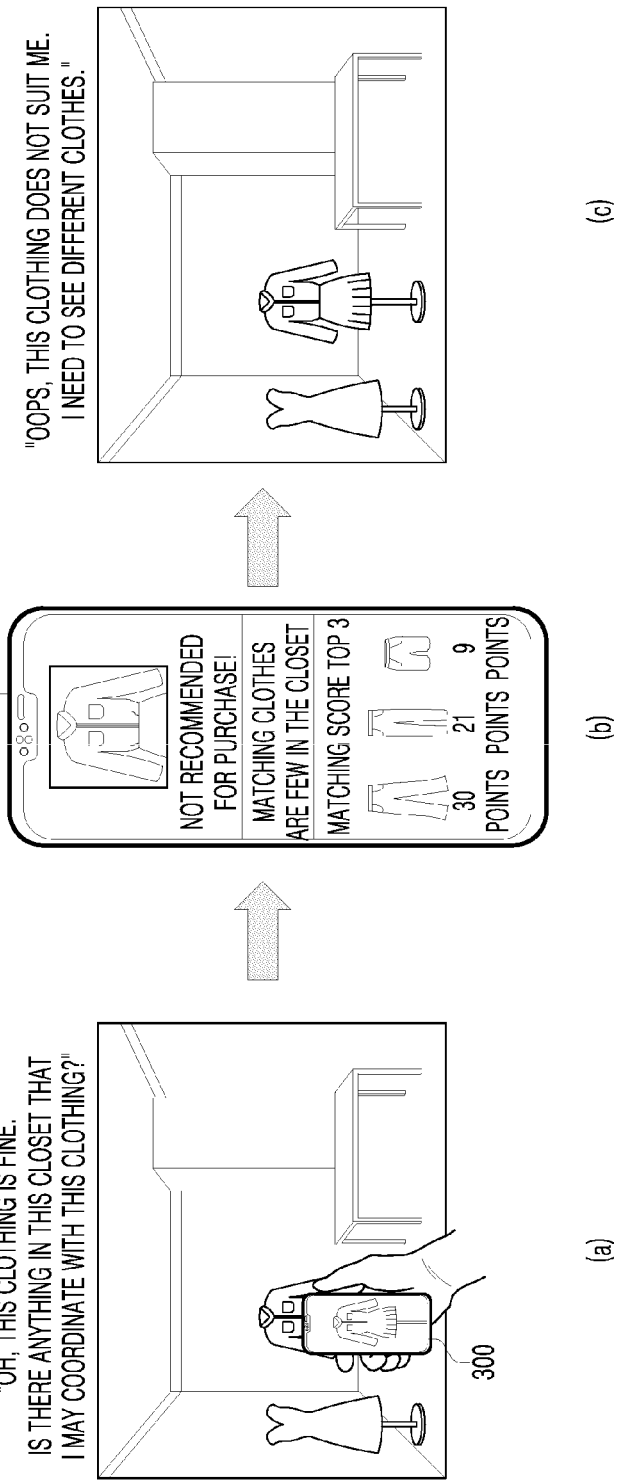
FIG. 10 is a diagram showing an example where the clothing coordination information recommendation apparatus of FIG. 3 transmits purchase recommendation information or purchase holding information to the user terminal corresponding to the clothing image that the user intends to purchase received from the user terminal.

FIG. 10 is a diagram showing an example where the clothing coordination information recommendation apparatus of FIG. 3 transmits purchase recommendation information or purchase holding information to the user terminal corresponding to the clothing image that the user intends to purchase received from the user terminal. In the following description, the common parts previously described with reference to FIG. 1 to FIG. 9 will not be described, so as to avoid repetitive description.

Referring to FIG. 10, FIG. 10A shows an example where the user finds favorite clothing during offline shopping, and photographs the clothing image that the user intends to purchase by using the user terminal 300. When the user executes the driving application of the clothing coordination information recommendation apparatus mounted in the user terminal 300, selects a menu for receiving the purchase recommendation information or the purchase holding information, and then uploads the clothing image that the user intends to purchase, the clothing coordination information recommendation apparatus 100 may collect the clothing image that the user intends to purchase.

FIG. 10B shows an example of aligning the calculated result of the harmony matching scores between the clothing image that the user intends to purchase and the clothing images registered in the database 140 in a descending order, and transmitting the harmony matching scores and the clothing images to the user terminal 300 together. Referring to FIG. 10B, shown is an example where the purchase holding information for holding the purchase of the clothing that the user intends to purchase is output because there is no the clothing image in which the harmony matching score exceeds a reference value (e.g., 70 points) in the user terminal 300.

FIG. 10C shows an example where the user who has confirmed the purchase holding information on the clothing that the user intends to purchase displayed on the user terminal 300 gives up the purchase of the clothing that the user intends to purchase. Through the operation of the clothing coordination information recommendation apparatus 100, it is possible to induce the user to purchase the clothing going with the clothing owned by the user, thereby preventing over consumption.

Figure 11:
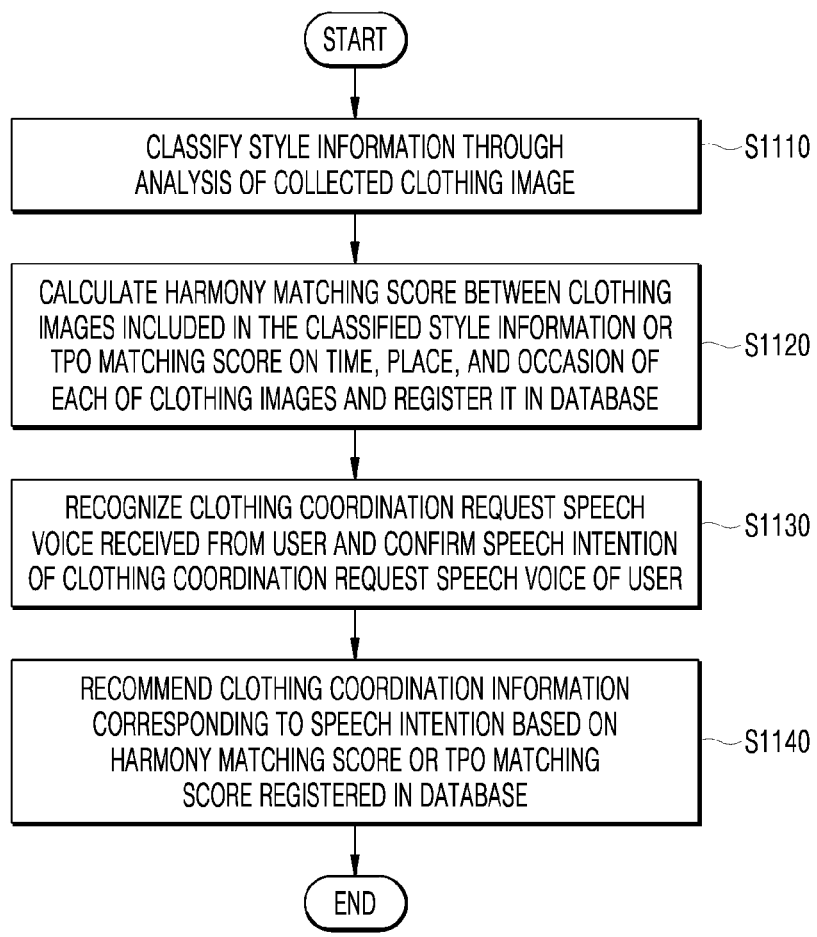
FIG. 11 is a flowchart for explaining a method for recommending clothing coordination information according to an embodiment of the present disclosure.

FIG. 11 is a flowchart for explaining a method for recommending clothing coordination information according to an embodiment of the present disclosure. In the following description, the common parts previously described with reference to FIG. 1 to FIG. 10 will not be described, so as to avoid repetitive description.

Referring to FIG. 11, in operation S1110, the clothing coordination information recommendation apparatus 100 classifies style information through the analysis of collected clothing image. Here, the style information may include appearance style information on the collected clothing image information, and abstract style information on the collected clothing image information. Here, the appearance style information may include visible substantial information such as a color, a material, a length, presence or absence of a collar, presence or absence of a pattern, etc. In addition, the abstract style information may include emotional information that may be felt when the corresponding clothing has been worn, such as neatness, softness, everyday, or summer.

In operation S1120, the clothing coordination information recommendation apparatus 100 calculates a harmony matching score between the clothing images included in the classified style information or a TPO matching score on a time, a place, and an occasion of each of the clothing images and registers the calculated score in the database. The clothing coordination information recommendation apparatus 100 may calculate a harmony matching level based on similarity and compatibility of the style information between the clothing images, and calculate the harmony matching score on the style by utilizing a siamese network technology. In addition, the clothing coordination information recommendation apparatus 100 may calculate the TPO matching score on a time, a place, and an occasion of the collected clothing image and register the TPO matching score in the database. Here, since different times, places, and occasions may be applied to each clothing image, the TPO matching score may be calculated by applying a higher weight to a more important element of the time, the place, and the occasion.

In operation S1130, the clothing coordination information recommendation apparatus 100 recognizes the clothing coordination request speech voice received from the user, and confirms the speech intention of the clothing coordination request speech voice of the user.

In operation S1140, the clothing coordination information recommendation apparatus 100 recommends clothing coordination information corresponding to the speech intention based on the harmony matching score or the TPO matching score registered in the database. The clothing coordination information recommendation apparatus 100 may recommend the clothing coordination information in the order of the highest score combination among the harmony matching scores of the clothing images registered in the database, based on the speech intention of the clothing coordination request speech voice of the user. The clothing coordination information recommendation apparatus 100 may collect weather information of a date when the clothing coordination request speech voice is received, and recommend the clothing coordination information in the order of the highest score combination among the harmony matching scores of the clothing registered in the database, based on the speech intention of the clothing coordination request speech voice and the weather information of the date when the clothing coordination request speech voice is received. The clothing coordination information recommendation apparatus 100 may receive the information on at least one of a time, a place, or an occasion to wear the coordinated clothing, included in the clothing coordination request speech voice of the user, and recommend the clothing coordination information corresponding to the speech intention based on the extracted information on at least one of the time, the place, or the occasion and the TPO matching score of each of the clothing images stored in the database.

As an optional embodiment, the clothing coordination information recommendation apparatus 100 may receive the clothing image that the user intends to purchase from the user terminal 300, calculate the harmony matching score between the clothing image that the user intends to purchase and the clothing image registered in the database, and transmit the purchase recommendation information or the purchase holding information to the user terminal 300 based on the harmony matching score.

The embodiments of the present disclosure described above may be implemented through computer programs executable through various components on a computer, and such computer programs may be recorded in computer-readable media. Examples of the computer readable medium may include magnetic media such as a hard disk drives (HDD), floppy disks and a magnetic tapes, optical media such as CD-ROMs and DVDs, magneto-optical media such as floptical disks, or hardware devices such as ROMs, RAMs, and flash memories specifically configured to store and execute program commands.

Meanwhile, the computer programs may be those specially designed and constructed for the purposes of the present disclosure or they may be of the kind well known and available to those skilled in the computer software arts. Examples of program code include both a machine code, such as produced by a compiler, and a higher-level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The above-mentioned steps constructing the method disclosed in the present disclosure may be performed in a proper order unless explicitly stated otherwise. However, the scope or spirit of the present disclosure is not limited thereto.

All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims.

Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for recommending clothing coordination information, the method comprising:
    classifying style information through an analysis of a collected clothing image;
    calculating a harmony matching score between clothing images comprised in the classified style information or a TPO (time, place and occasion) matching score on a time, a place, and an occasion of each of the clothing images and registering the calculated score in a database;
    recognizing a clothing coordination request speech voice received from a user, and confirming the speech intention of the clothing coordination request speech voice of the user; and
    recommending clothing coordination information corresponding to the speech intention, based on the harmony matching score or the TPO matching score registered in the database,
    wherein the recommending comprises:
    recommending the clothing coordination information in the order of the highest score combination of the harmony matching scores of the clothing images registered in the database, based on the speech intention of the clothing coordination request speech voice.

2. A method for recommending clothing coordination information, the method comprising:
    classifying style information through an analysis of a collected clothing image;
    calculating a harmony matching score between clothing images comprised in the classified style information or a TPO (time, place and occasion) matching score on a time, a place, and an occasion of each of the clothing images and registering the calculated score in a database;
    recognizing a clothing coordination request speech voice received from a user, and confirming the speech intention of the clothing coordination request speech voice of the user; and
    recommending clothing coordination information corresponding to the speech intention, based on the harmony matching score or the TPO matching score registered in the database,
    wherein the classifying the style information comprises:
    classifying appearance style information of the collected clothing image by analyzing a feature vector extracted from the collected clothing image by using a first deep neural network model previously trained so as to classify appearance style information of a clothing image by analyzing a feature vector extracted from the clothing image; and
    classifying abstract style information of the collected clothing image by analyzing the appearance style information generated from the collected clothing image by using a second deep neural network model previously trained so as to classify abstract style information of a clothing image by analyzing the appearance style information of the clothing image.

3. The method claim 1, wherein the confirming the speech intention comprises:
    extracting information on at least one of a time, a place, or an occasion to wear the coordinated clothing from the clothing coordination request speech voice received from the user, and
    wherein the recommending the clothing coordination information comprises recommending the clothing coordination information corresponding to the speech intention based on the extracted information on at least one of the time, the place, or the occasion and the TPO matching score of each of the clothing images stored in the database.

4. The method of claim 1, wherein the registering comprises:
    calculating the harmony matching score of the collected clothing image on a clothing image owned by the user and registering the harmony matching score in the database, based on the similarity between style information comprising the appearance style information and the abstract style information on the collected clothing image, and style information on the clothing image owned by the user registered in the database.

5. The method of claim 1, wherein the registering comprises:
    calculating the harmony matching score of the collected clothing image on an image for which clothing coordination has been completed and registering the harmony matching score in the database, based on the similarity between the collected clothing image, and the image for which the clothing coordination has been completed and which has been collected from clothing shopping malls.

6. A non-transitory computer readable recording medium in which a computer program for executing the method of claim 1 by using a computer has been stored.

7. The method of claim 1, further comprising collecting weather information of a date when the clothing coordination request speech voice is received,
    wherein the recommending comprises:
    recommending the clothing coordination information in the order of the highest score combination of the harmony matching scores of the clothing images registered in the database, based on the speech intention of the clothing coordination request speech voice and weather information of the date when the clothing coordination request speech voice is received.

8. The method of claim 1, further comprising:
    collecting a clothing image that the user intends to purchase from a user terminal;
    calculating the harmony matching score between the clothing image that the user intends to purchase and the clothing image registered in the database by analyzing the clothing image that the user intends to purchase and style information of the clothing image that the user intends to purchase by using a third deep neural network model previously trained so as to calculate harmony matching score between clothing images through analysis of the clothing image and the style information; and transmitting purchase recommendation information or purchase holding information to the user terminal based on the harmony matching score.

9. An apparatus for recommending clothing coordination information, the apparatus comprising:
a processor; and
a memory coupled to the processor,
the processor configured to:
classify style information through an analysis of a collected clothing image;
calculate a harmony matching score between clothing images comprised in the classified style information or a TPO (time, place and occasion) matching score on a time, a place, and an occasion of each of the clothing images and registering the calculated score in the database;
recognize a clothing coordination request speech voice received from a user, and confirming the speech intention of the clothing coordination request speech voice of the user; and
recommend clothing coordination information corresponding to the speech intention, based on the harmony matching score or the TPO matching score registered in the database,
wherein the processor is further configured to:
recommend the clothing coordination information in the order of the highest score combination of the harmony matching scores of the clothing images registered in the database, based on the speech intention of the clothing coordination request speech voice.

10. The apparatus of claim 9, wherein the processor is further configured to:
collect the clothing image that the user intends to purchase from a user terminal,
calculate the harmony matching score between the clothing image that the user intends to purchase and the clothing image registered in the database by analyzing the clothing image that the user intends to purchase and style information of the clothing image that the user intends to purchase by using a third deep neural network model previously trained so as to calculate harmony matching score between clothing images through analysis of the clothing images and the style information, and
transmit purchase recommendation information or purchase holding information to the user terminal based on the harmony matching score.

11. The apparatus of claim 9, wherein the processor is further configured to:
classify appearance style information of the collected clothing image by analyzing a feature vector extracted from the collected clothing image by using a first deep neural network model previously trained so as to classify appearance style information of a clothing image by analyzing a feature vector extracted from the clothing image, and
classify abstract style information of the collected clothing image by analyzing the appearance style information generated from the collected clothing image by using a second deep neural network model previously trained so as to classify abstract style information of the clothing image by analyzing the appearance style information of the clothing image.

12. The apparatus of claim 9, wherein the processor is further configured to:
extract information on at least one of the time, the place, or the occasion to wear the coordinated clothing from the clothing coordination request speech voice received from the user, and
recommend the clothing coordination information corresponding to the speech intention based on the extracted information on at least one of the time, the place, or the occasion and the TPO matching score of each of the clothing images stored in the database.

13. The apparatus of claim 9, wherein the processor is further configured to:
calculate the harmony matching score of the collected clothing image on a clothing image owned by the user and register the harmony matching score in the database, based on the similarity between style information comprising appearance style information and abstract style information on the collected clothing image, and style information on the clothing image owned by the user registered in the database.

14. The apparatus of claim 9, wherein the processor is further configured to:
calculate the harmony matching score of the collected clothing image on an image for which the clothing coordination has been completed and to register the harmony matching score in the database, based on the similarity between the collected clothing image, and the image for which the clothing coordination has been completed and which has been collected from clothing shopping malls.

15. The apparatus of claim 9, wherein the processor is further configured to:
collect weather information of a date when the clothing coordination request speech voice is received, and
recommend the clothing coordination information in the order of the highest score combination of the harmony matching scores of the clothing images registered in the database, based on the speech intention of the clothing coordination request speech voice and the weather information of the date when the clothing coordination request speech voice is received.

* * * * *